United States Patent [19]
Mansbridge

[11] Patent Number: 6,050,514
[45] Date of Patent: Apr. 18, 2000

[54] TAPE BLOCK AND TAKE-UP REEL ASSEMBLY FOR A MAGNETIC TAPE TRANSPORT SYSTEM

[75] Inventor: Geoffrey W. Mansbridge, Boise, Id.

[73] Assignee: Hewlett-Packard Company, Palo Alto, Calif.

[21] Appl. No.: 09/010,418

[22] Filed: Jan. 21, 1998

[51] Int. Cl.[7] .............................. G11B 15/66; B65H 19/28

[52] U.S. Cl. .................................... 242/332.7; 242/332.4; 242/532.1

[58] Field of Search .............................. 242/332.4, 332.7, 242/532.1, 582, 336; 360/132

[56] References Cited

U.S. PATENT DOCUMENTS

| | | | |
|---|---|---|---|
| 3,664,607 | 5/1972 | Trefzger et al. | 242/332.4 |
| 5,031,065 | 7/1991 | Flor et al. | 242/336 |

*Primary Examiner*—John Q. Nguyen
*Attorney, Agent, or Firm*—Matthew L. Wade

[57] ABSTRACT

A tape block and take-up reel assembly for use in a non-continuous cartridge based magnetic tape transport system. The take-up reel assembly includes a leader tape and a leader block. The tape block connection features and the leader block receiving features allow for a connection to be established therebetween as a result of orienting the tape block and leader block from a pre-connective orientation to a pre-connective mated orientation. These orientations are primarily achieved by moving the cartridge into the tape transport system and by winding the take-up reel assembly.

6 Claims, 8 Drawing Sheets

TAPE BLOCK AND TAKE-UP REEL ASSEMBLY FOR A MAGNETIC TAPE TRANSPORT SYSTEM

FIELD OF THE INVENTION

This invention relates in general to automatic web threading apparatus and, in particular, to an improved threading apparatus for use with a magnetic tape transport which includes a removable data storage cartridge containing a supply reel of magnetic tape and a non-removable take-up reel on which the tape is wound.

BACKGROUND OF THE INVENTION

In a non-continuous magnetic tape system, magnetic tape is wound around one reel and retrieved from another reel by a tape transport system. This arrangement can be present in traditional reel-to-reel systems, two-reel cartridge systems and single reel cartridge systems.

In the case of non-continuous single cartridge systems, the supply reel for the magnetic tape medium is carried in the cartridge. The cartridge is capable of being easily loaded into the tape transport system for recording (writing) and reproducing (reading). The cartridge is also easily removed from the system for storage. A take-up reel or hub is permanently carried by the tape transport system.

For the purposes of this discussion, the reel which at any given time is discharging tape will be referred to as in an "unwinding condition", and the reel which at any given time is receiving tape will be referred to as in a "winding condition".

To make loading and removal of the cartridge as easy as possible, techniques have been developed for automatically threading the magnetic tape medium from the cartridge to the take-up reel and through the various stations of the tape transport system. One automatic threading system includes a semi-rigid leader tape (leader tape). One end of the leader tape is permanently attached to the take-up reel and the other end of the leader tape is attached to a leader block. The to-be-threaded magnetic tape in the cartridge includes a tape block attached to the free end of the magnetic tape.

To accomplish automatic threading, the cartridge is inserted into the tape transport system. Upon insertion of the cartridge, a cartridge engagement (and disengagement) mechanism moves the cartridge through a cartridge load path and positions the cartridge appropriately in the tape transport system. The tape block and leader block are then joined together by the block connection mechanism residing in the tape transport system. It is noted that the complexity and therefore the cost of the cartridge engagement mechanism is in large part a function of the complexity of the cartridge load path and how precisely the cartridge engagement mechanism must position the cartridge in the tape transport system. In addition, the complexity and therefore cost of the block connection mechanism is a function of the difficulty in forming the connection between the tape block and leader block.

After the leader block and tape block are joined, the take-up reel is then placed in a winding condition resulting in the leader tape being wrapped onto the take-up reel and the magnetic tape being pulled from the cartridge through the tape threading path of the tape transport system. During this operation, the joined tape block and leader block (joined blocks) travel through the threading path of the tape transport system and are eventually received by the take-up reel. Thus the leader tape and the joined blocks become the substrate for subsequent wraps of magnetic tape onto the take-up reel.

It is highly desirable for the substrate formed by the leader tape and joined blocks to be smooth and cylindrical in order to achieve proper packing of the magnetic tape on the take-up reel. If a smooth cylindrical substrate is not formed, creases could be formed in the subsequent layers of magnetic tape. This can cause problems in the reuse of the tape since magnetic transitions might occur at the creases making the resensing of the magnetic transitions less reliable.

SUMMARY OF THE INVENTION

This invention provides a tape block and a take-up reel assembly for use in a non-continuous cartridge based magnetic tape transport system. In the preferred embodiment, the take-up reel assembly includes a leader tape and a leader block. One end of the leader tape is attached to the take-up reel and the other end is attached to the leader block. The tape block connection features and the leader block receiving features allow for a connection to be established therebetween as a result of orienting the tape block and leader block first to a pre-connective orientation, then to a pre-connective mated orientation and finally to a connective orientation. These orientations are primarily achieved by moving the cartridge through a simple load path into the tape transport system and by winding the take-up reel assembly. The upper connection features of the tape block include an upper substantially cylindrical shaped outer surface and an upper rib section. The lower connection features of the tape block include a lower substantially cylindrical shaped outer surface and a lower rib section. In addition, a leader block is described having upper and lower receiving features. The upper receiving features include an inner wall having a substantially cylindrical shaped section forming a bore therethrough that is shaped to axially and closely receive the upper cylindrical surface of the tape block. The upper receiving features further include a bearing surface for the upper rib section of the tape block while the tape block is in the pre-connective mated orientation and the connective orientation. The lower receiving features of the leader block include a C-shaped inner wall and a lower bearing surface. The C-shaped inner wall forms a C-shaped aperture therethrough to axially and closely receive the lower cylindrical surface of the tape block. Extending on each side of the vertical edges of the C-shaped inner wall are a pair of gap surfaces spaced a distance apart to allow the lower rib section to pass therethrough only if the tape block and leader block are at a pre-connective angle. Upon the tape block and the leader block reaching the pre-connective mated orientation the upper cylindrical surface of the tape block is located in the bore formed by the inner wall of the tape block and the lower cylindrical surface is located in the C-shaped aperture formed by the C-shaped wall of the leader block. After reaching the pre-connective mated orientation, the two blocks may then be hingedly joined by moving the tape block and leader block to a connective orientation. This can be accomplished by placing the take-up reel in a winding condition thereby rotating the lower rib section of the tape block below the lower bearing surface of the leader block. The tape block and leader block remain in a connective orientation throughout the transport of the magnetic tape through the tape transport system. The take-up reel includes a pair of horizontal surfaces and a pair of grooves. The pair of horizontal surfaces are adapted to receive the connection features of the tape block and the receiving features of the leader block. Also, the leader tape includes two pairs of rib sections each pair forming an aperture therebetween. The aperture is sized so that upon the third wrap of leader tape, the pair of grooves are left exposed allowing the support members of the leader block and tape block to be properly received.

DETAILED DESCRIPTION OF THE INVENTION

Figure 1:
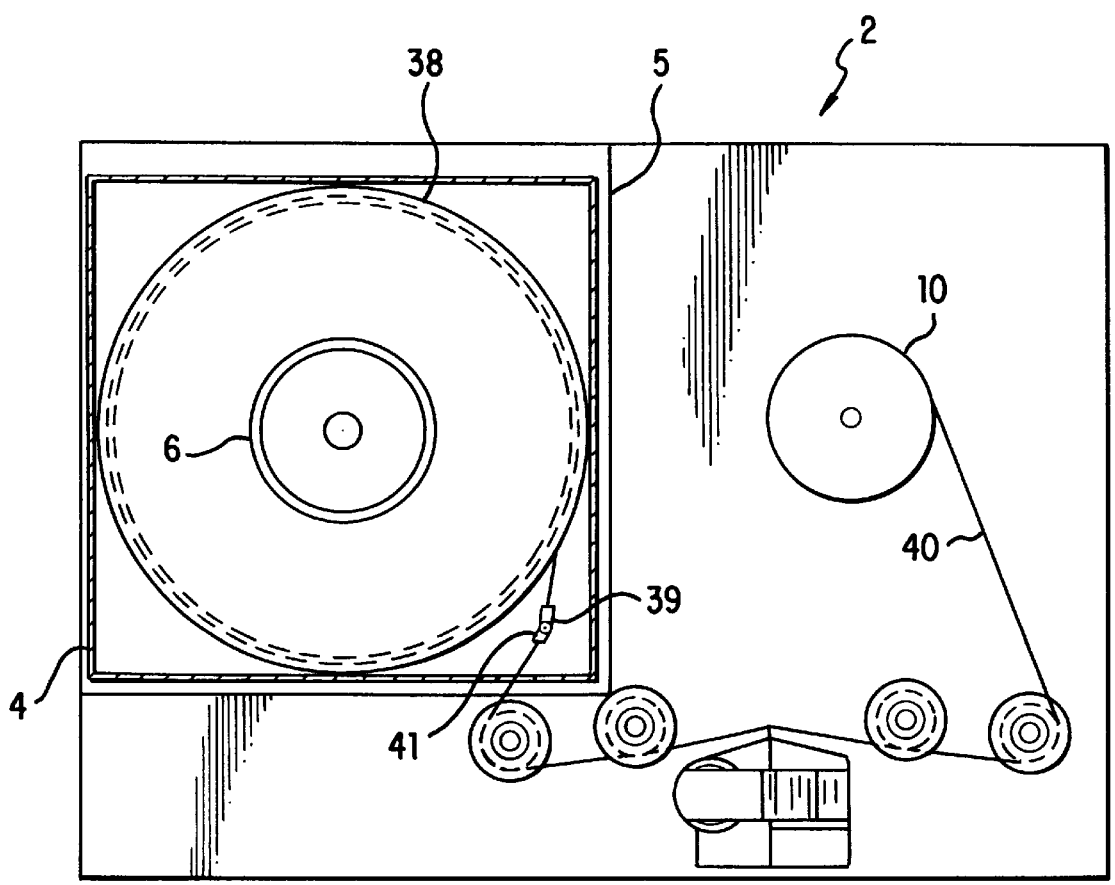
FIG. 1 is a plan view of a tape drive system having the preferred embodiment of the present invention.

For an initial understanding of the present invention, attention is first directed to FIG. 1 which sets forth a plan view of the invention. FIG. 1 only illustrates the components that are required to understand and appreciate the invention.

In general, tape transport system 2 includes a cartridge engagement mechanism 5 that is designed to accept a magnetic tape cartridge (cartridge) of a specified format, move the cartridge through a load path and appropriately position the cartridge in tape transport system 2 for automatic tape threading. Tape transport system 2 further includes a take-up reel 10, a leader tape 40 and a leader block 41. Leader tape 40 is attached at one end to take-up reel 10. The other end of leader tape 40 is attached to leader block 41. Cartridge 4 is shown loaded in tape transport system 2 and includes a supply reel 6 on which magnetic tape 38 is wound. The free end of magnetic tape 38 is attached to tape block 39.

Figure 2:
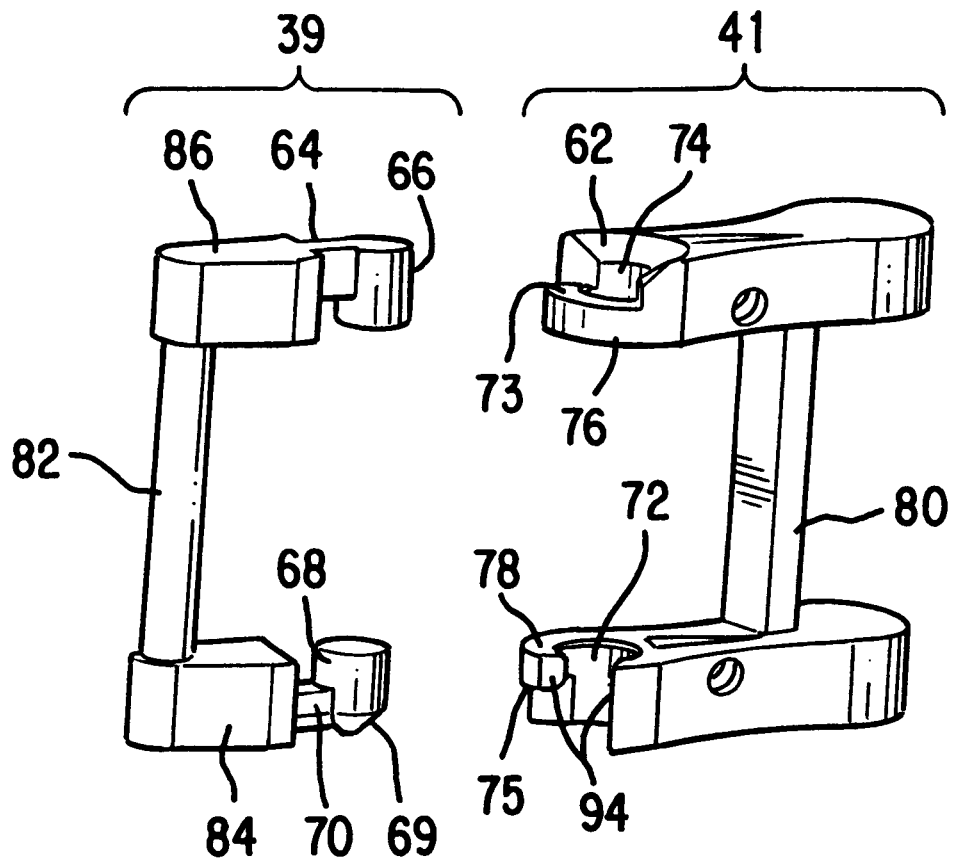
FIG. 2 is a perspective view illustrating the preferred embodiment of leader block and tape block.

FIG. 2 illustrates the preferred embodiment of the inventive leader block and tape block. The features of tape block 39 used to form a connection with leader block 41 are referred to herein as the "connection features" of tape block 39. Likewise, the features of leader block 41 used to receive the connection features of tape block 39 and form a connection therebetween are referred to herein as the "receiving features" of leader block 41.

The connection features of tape block 39 are included in an upper section 86 and a lower section 84 of tape block 39. The connection features that are part of upper section 86 are referred to herein as the "upper connection features" of tape block 39. Likewise, the connection features that are part of lower section 84 are referred to herein as the "lower connection features" of tape block 39.

The upper connection features of tape block 39 include a substantially cylindrical shaped outer surface (upper cylindrical surface) 66 and a rib section 64. Likewise, the lower connection features include a substantially cylindrical shaped outer surface (lower cylindrical surface) 68 and a rib section 70. The lower connection features further include a conical surface 69 extending downward from the lower edge of lower cylindrical surface 68. Both upper cylindrical surface 66 and lower cylindrical surface 68 oppose each other and substantially share a common cylindrical axis referred to herein as the tape block connection axis.

The receiving features of leader block 41 are included in an upper section 76 and a lower section 78. The receiving features that are part of upper section 76 are referred to herein as the "upper receiving features" of leader block 41. Likewise, the receiving features that are part of lower section 78 are referred to herein as the "lower receiving features" of leader block 41.

The upper receiving features of leader block 41 include an inner wall 74 having a substantially cylindrical shaped section forming a bore therethrough sized to axially and closely receive the upper cylindrical surface 66 of tape block 39. The upper receiving features of leader block 41 also include an upper bearing surface 73 and an inclined surface 62. Upper bearing surface 73 provides a bearing surface for rib section 64 of tape block 39 upon the connection of leader block 41 to tape block 39. Inclined surface 62 extends at an angle, from the upper edge of inner wall 74 and is adapted to guide upper cylindrical surface 66 into the bore formed by inner wall 74 during the connection of tape block 39 to leader block 41. The range of angles for inclined surface 62 is defined by the angles useful to provide a guided fit for upper cylindrical surface 66 into inner wall 74 during connection.

The lower receiving features of leader block 41 includes a C-shaped inner wall 72 and a lower bearing surface 75. C-shaped inner wall 72 (coupler) forms a C-shaped aperture therethrough to axially and closely receive the lower cylindrical surface 68 of tape block 39. Both inner wall 74 and the C-shaped inner wall 72 substantially share a common cylindrical axis referred to herein as the "leader block connection axis". Extending on each side of the vertical edges of C-shaped inner wall 72 are a pair of gap surfaces 94 spaced a distance apart to allow rib section 70 to pass therethrough during the connection of tape block 39 to leader block 41. Additional details of the connection features of tape block 39 and receiving features of leader block 41 are discussed below in the context of loading cartridge 4 into tape transport system 2.

Referring to FIG. 1 and FIG. 2, upon inserting cartridge 4 into tape transport system 2, cartridge 4 is received by cartridge engagement mechanism 5. The cartridge engagement mechanism 5 first laterally moves cartridge 4 into tape transport system 2 and then moves cartridge 4 in a downward direction until cartridge 4 is seated in tape transport system 2. As cartridge 4 is moved laterally into tape transport system 2, tape block 39 (moving along with cartridge 4) is oriented such that: 1.) upper cylindrical surface 66 is above inner wall 74, 2.) lower cylindrical surface 68 is between the lower edge of inner wall 74 and the upper edge of the C-shaped inner wall 72, 3.) tape block 39 connection axis and leader block 41 connection axis are substantially aligned along a common connection axis, and 4.) tape block 39 and leader block 41 are at an angle as viewed from above and along the common connection axis, so that rib section 70 is above the gap formed between gap surfaces 94. This angle is referred to herein as the "pre-connective angle" and the orientation of tape block 39 and leader block 41 just described is referred to herein as the "pre-connective orientation".

Upon tape block 39 and leader block 41 obtaining the pre-connective orientation, cartridge 4 is moved by cartridge engagement mechanism 5 in a downward direction. During this movement, tape block 39 moves with cartridge 4 substantially along the common connection axis while generally remaining at the pre-connective angle with respect to leader block 41. As a result, rib section 70 of tape block 39 is free to pass through the gap formed between gap surfaces 94 of leader block 41. During this downward movement, inclined surface 62 serves as a first self-alignment feature so that upper cylindrical surface 66 is guided into the bore defined by inner wall 74 of leader block 41. Also, the lower conical surface 69 of tape block 39 serves as a second self-alignment feature and guides lower cylindrical surface 68 of tape block 39 into the C-shaped aperture formed by C-shaped inner wall 72 of leader block 41.

Cartridge 4 is fully seated in tape transport system 2 once the lower surface of rib section 64 comes to rest upon upper bearing surface 73 and the upper surface of rib section 70 sits below the horizontal plane of lower bearing surface 75. This orientation of tape block 39 with respect to leader block 41 is referred to herein as the "pre-connective mated orientation". It is noted that the pre-connective angle has been generally maintained throughout the downward movement of tape block 39. In FIG. 1, tape block 39 and leader block 41 are illustrated being at a pre-connective angle.

While in the pre-connective mated orientation, tape block 39 and leader block 41 each has only two degrees of freedom. The first degree of freedom is rotation about the common connection axis. The second degree of freedom is along the common connection axis as leader block 41 and tape block 39 are free to move apart along the common connection axis.

Figure 3:
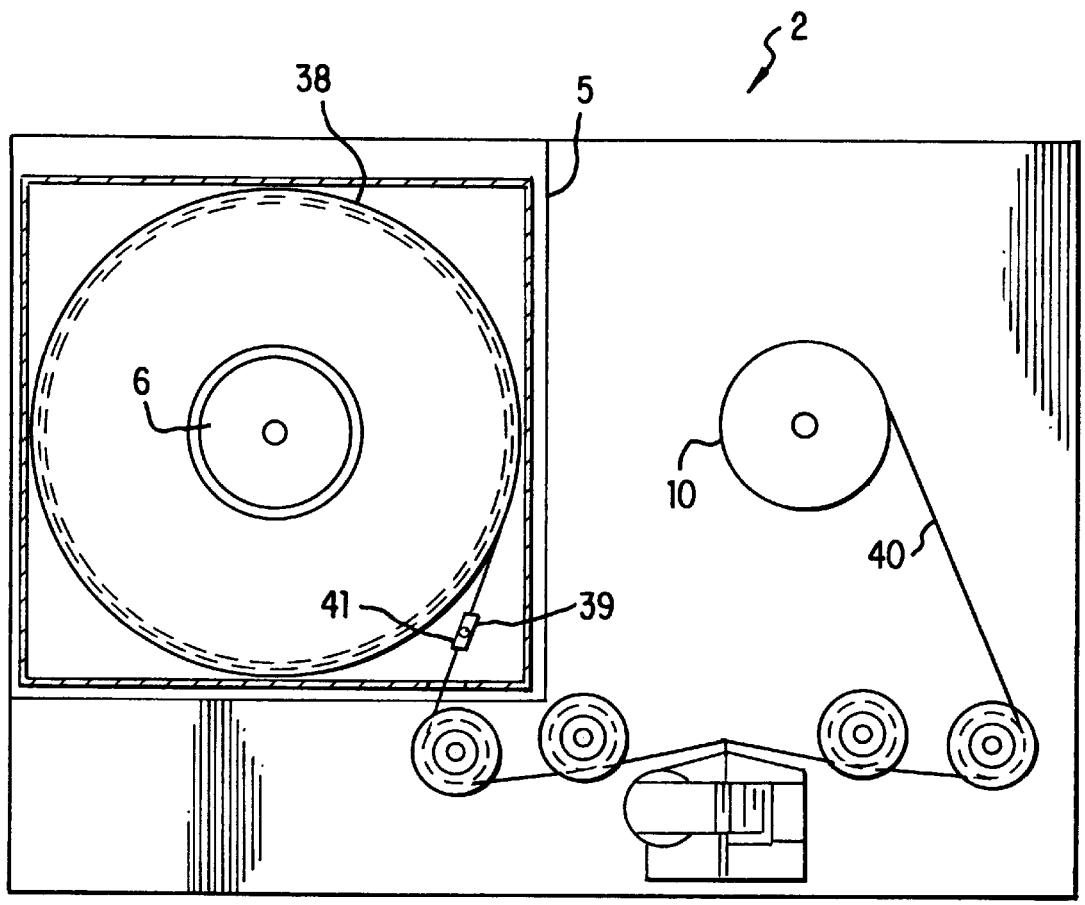
FIG. 3 is a plan view of the tape drive system having the preferred embodiment of the present invention to illustrate the leader block and tape block at a connective orientation.

Upon tape block 39 and leader block 41 reaching the pre-connective mated orientation the two blocks may then be hingedly joined by placing take-up reel 10 in a winding condition. This results in tape block 39 and leader block 41 being rotated about the common connection axis from the pre-connective angle so that rib section 70 moves below lower bearing surface 75. As a result, the second degree of freedom is removed because rib section 70 is captured below lower bearing surface 75 and rib section 64 is captured above upper bearing surface 73. Thus as long as rib section 70 remains below lower bearing surface 75, tape block 39 and leader block 41 are free to rotate about the common connection axis but are not free to move apart. Tape block 39 and leader block 41 oriented in this manner is referred to herein as being in a "connective orientation". Also, the angle between tape block 39 and leader block 41 while in a connective orientation as viewed from above and along the common connection axis is referred to herein as a "connective angle". FIG. 3 illustrates tape block 39 and leader block 41 at a connective angle.

It can be seen that the pre-connective angle is determined by the position of gap surfaces 94 and the connective angles are determined by the position and arc length of bearing surfaces 73 and 75 (retainer). In this preferred embodiment, gap surfaces 94 are positioned such that the pre-connective angle is approximately 40 degrees. The position and arc length of upper bearing surface 73 and lower bearing surface 75 are such that the connective angles range (in a counter clockwise direction) from 39 degrees to –40 degrees. The pre-connective angle and connective angles are designed with knowledge of the set of angles, referred to herein as the "transport angles", that leader block 41 and tape block 39 must obtain with respect to each other in order to traverse the threading path of tape transport system 2. At a minimum, the connective angles include the transport angles. This ensures tape block 39 and leader block 41 remain hingedly joined during the magnetic tape transport operation of tape transport system 2.

In order to eject cartridge 4 from tape transport system 2, supply reel 6 is initially placed in a winding condition. As a result, magnetic tape 38 is pulled through threading path 50 and wrapped onto supply reel 6 until leader block 41 and tape block 39 is positioned as shown in FIG. 3. After reaching this position, the cartridge engagement mechanism 5 or block connection mechanism rotates leader block 41 and tape block 39 about the common connection axis to the pre-connective angle. FIG. 1 illustrates leader block 41 and tape block 39 at the pre-connective angle. After reaching the pre-connective angle, tape block 39 and leader block 41 are free to move apart and cartridge engagement mechanism 5 ejects cartridge 4 by first lifting cartridge 4 in an upward direction so that tape block 39 moves along the common connection axis to the pre-connective orientation. Once in the pre-connective orientation, leader block 41 and tape block 39 are no longer mated. The cartridge engagement mechanism 5 then laterally moves cartridge 4 out of tape transport system 2.

Referring to FIG. 2, tape block 39 further includes a support member 82 that maintains the connection features of tape block 39 in alignment with each other and outside the magnetic tape threading path. Likewise, leader block 41 includes a support member 80 that maintains the receiving features of leader block 41 in alignment with each other and outside the magnetic tape threading path.

Figure 4:
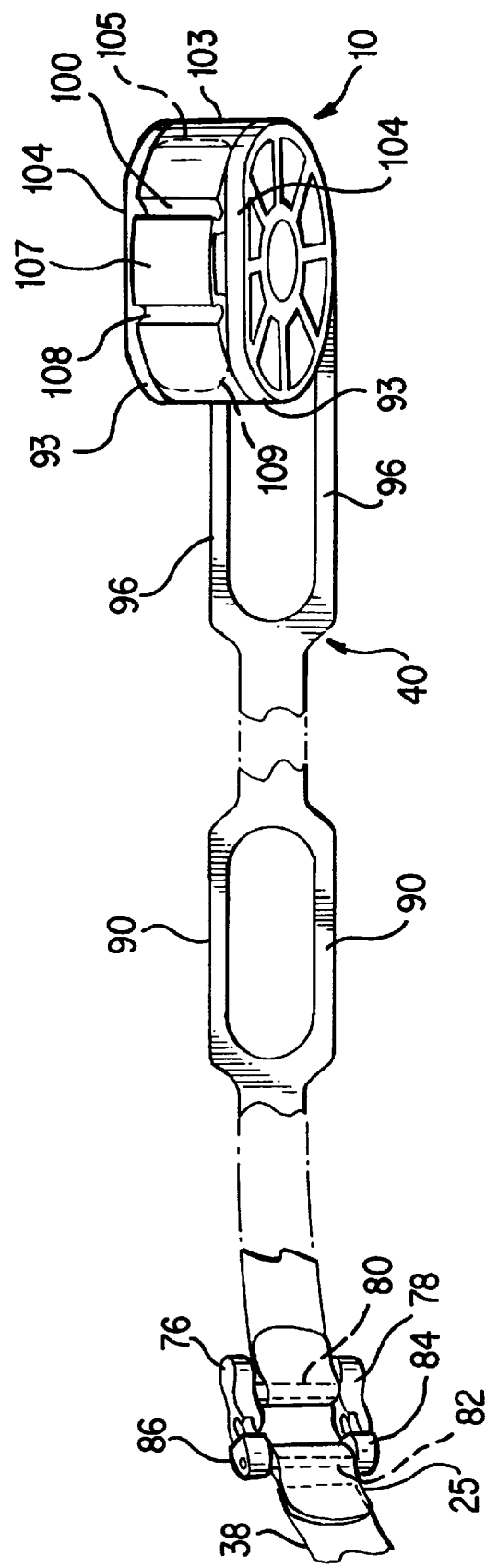
FIG. 4 is a perspective view illustrating the take-up reel and leader tape.

FIG. 4 illustrates the technique used to couple magnetic tape 38 to tape block 39 and leader tape 40 to leader block 41. To couple magnetic tape 38 to tape block 39 a section of magnetic tape coupling material (tape coupling material) 25 is looped about support member 82 of tape block 39 and is bonded together. This bonded area is referred to herein as the "tape coupling bonded area". Magnetic tape 38 is bonded appropriately to tape coupling material 25. The tape coupling material 25 in this implementation, is substantially the same thickness as leader tape 40 and therefore the tape coupling bonded area (consisting of two layers of tape coupling material 25) is an area that is substantially twice as thick as leader tape 40. To couple leader tape 40 to leader block 41, the free end of leader tape 40 is looped about support member 80 of leader block 41 and bonded together. This bonded area is referred to herein as the "leader tape coupling area". Thus, like the tape coupling bonded area, the leader tape coupling area is also twice as thick as leader tape 40. As explained in more detail below, the construction of the tape coupling bonded area and the leader tape coupling area are important for the creation of a smooth cylindrical substrate on take-up reel 10 for magnetic tape 38.

FIG. 4 also illustrates take-up reel 10, leader tape 40 and magnetic tape 38. In this preferred embodiment, leader tape 40 is a length that is approximately three times the circumference of take-up reel 10 which is sufficient to traverse the magnetic tape threading path of tape transport system 2. Leader tape 40 is shown in three segments, the first leader tape segment includes a first pair of rib sections 96 forming a U-shaped first aperture therebetween. The second leader tape segment includes a second pair of rib sections 90 forming a second aperture therebetween. Take-up reel 10 includes an outer cylindrical surface 103 having a pair of curved grooves 93, a leader block support member receiving groove (leader groove) 108, a tape block support member receiving groove (tape groove) 100 a pair of horizontal surfaces 104 and a section of bridge material 107. Bridge material 107 is substantially twice as thick as leader tape 40 and is bonded to the outer cylindrical surface 103 between leader groove 108 and tape groove 100. Both the curved grooves 93 and the horizontal surfaces 104 are adapted to receive the first pair of rib sections 96 and then the second pair of rib sections 90 during the first and second wrap of leader tape 40 onto take-up reel 10. Both rib sections 96 and 90 are sized so that after the second wrap of leader tape 40, the cylindrical surface area of take-up reel 10 between dotted lines 109 and 105 are left exposed. It is noted that in another embodiment of the leader tape, support sections may be included that span between the rib sections of the leader tape. In addition, the leader groove and tape groove of the take-up reel can be adapted to receive these support sections as the leader tape is wrapped onto the take-up hub.

Figure 5:
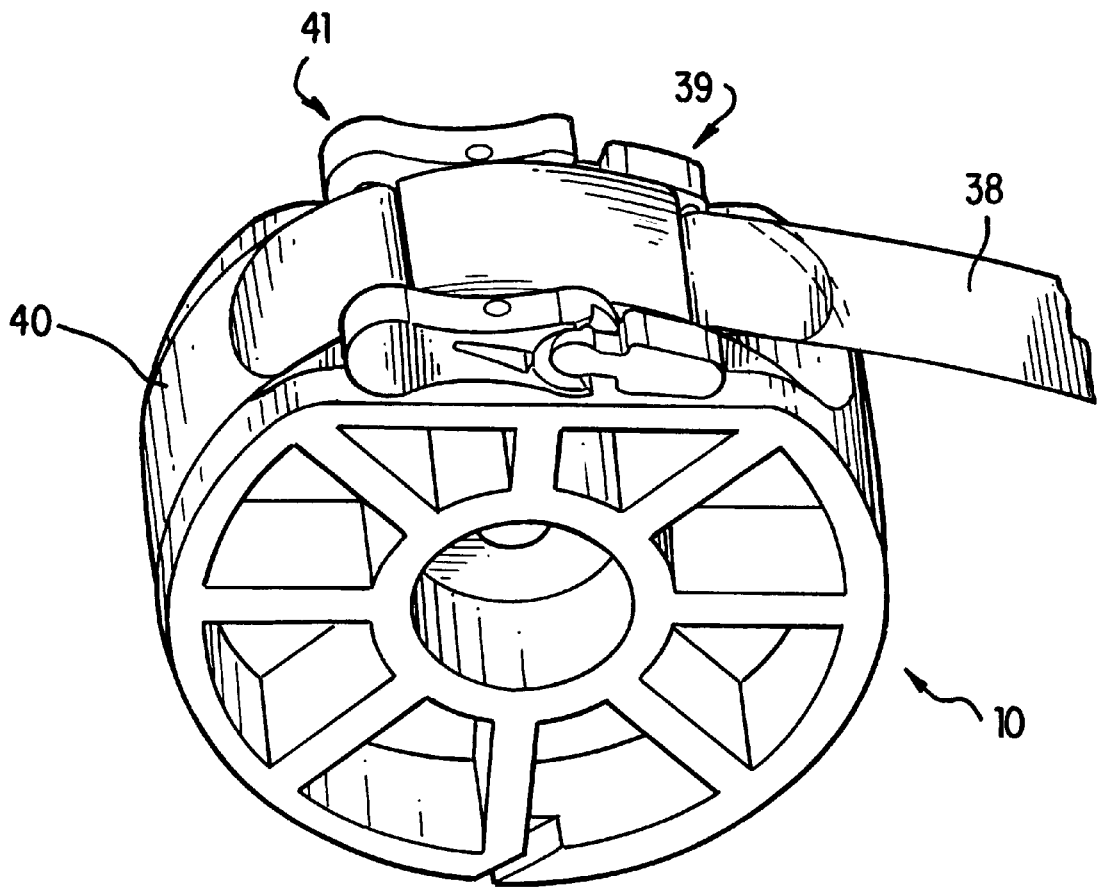
FIG. 5 is a perspective view illustrating the leader block and tape block assembled to the take-up reel after the third wrap of leader tape.

FIG. 5 is a perspective view of take-up reel 10, leader tape 40, leader block 41 and tape block 39 after the third wrap of leader tape 40. Referring both to FIG. 4 and FIG. 5, during the third wrap of leader tape 40 onto take-up reel 10, the leader block 41 and tape block 39 are received by take-up reel 10. Horizontal surfaces 104 receives upper section 86 and lower section 84 of tape block 39 as well as upper section 76 and lower section 78 of leader block 41. Leader groove 108 closely receives support member 80 with leader tape 40 looped thereon so that support member 80 is located just below outer cylindrical surface 103. In addition, the leader tape coupling area is positioned in the exposed area between dotted line 109 and leader groove 108. Similarly, tape groove 100 closely receives support member 82 with tape coupling material 25 looped thereon so that support member 82 is located just below outer cylindrical surface 103. Also the tape coupling bonded area is positioned in the exposed area between dotted line 105 and tape groove 100.

Figure 6:
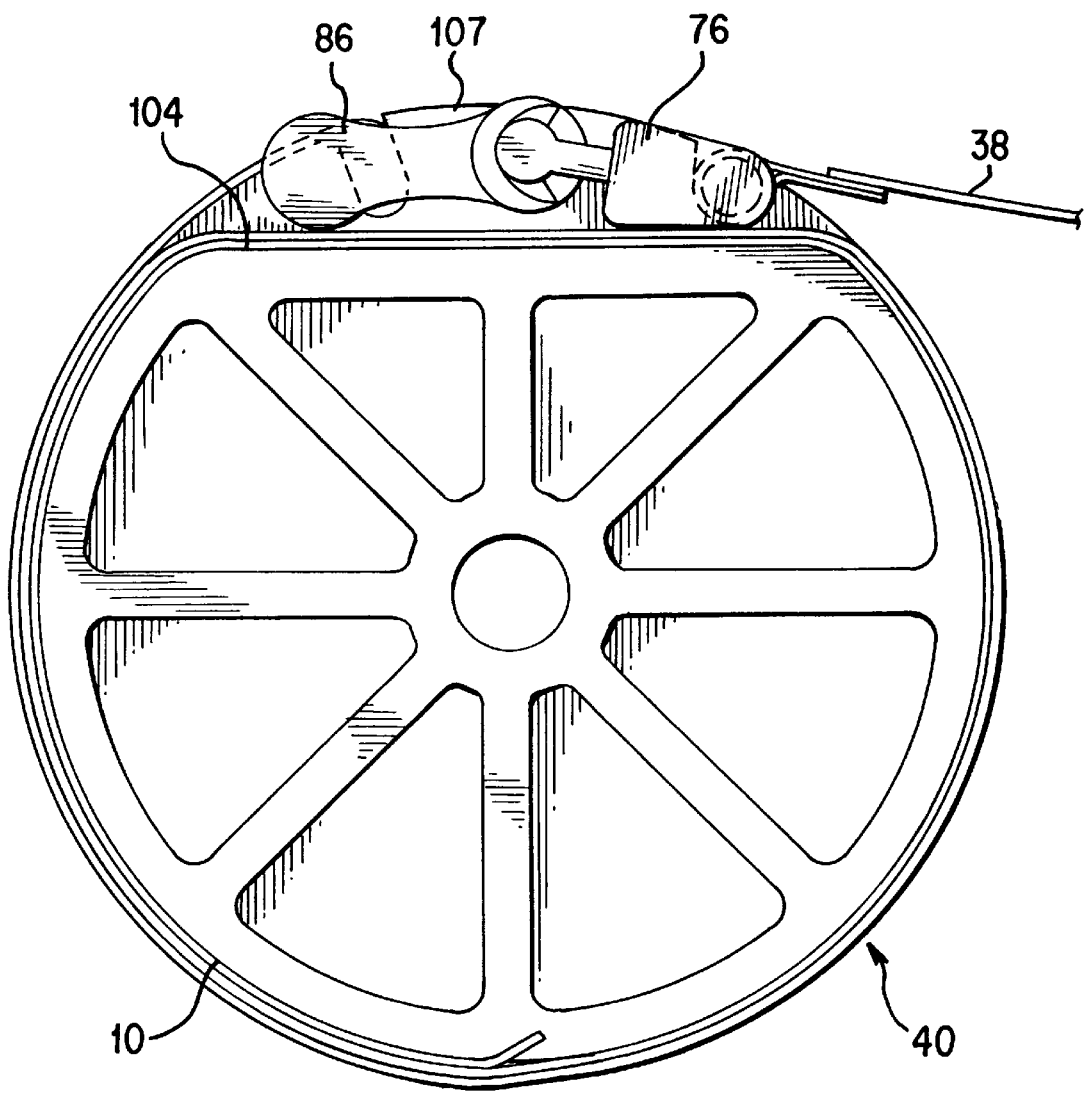
FIG. 6 is sectional view illustrating the connected leader block and tape block positioned on the take-up reel after several wraps of leader tape.

FIG. 6 is a sectional view of take-up reel 10 after the third wrap of leader tape 40 has been wrapped onto take-up reel 10. As illustrated, the tape coupling bonded area and leader tape coupling area in combination with bridge material 107 results in a smooth cylindrical substrate after the third wrap of leader tape 40 being created for subsequent wraps of magnetic tape.

Figure 7:
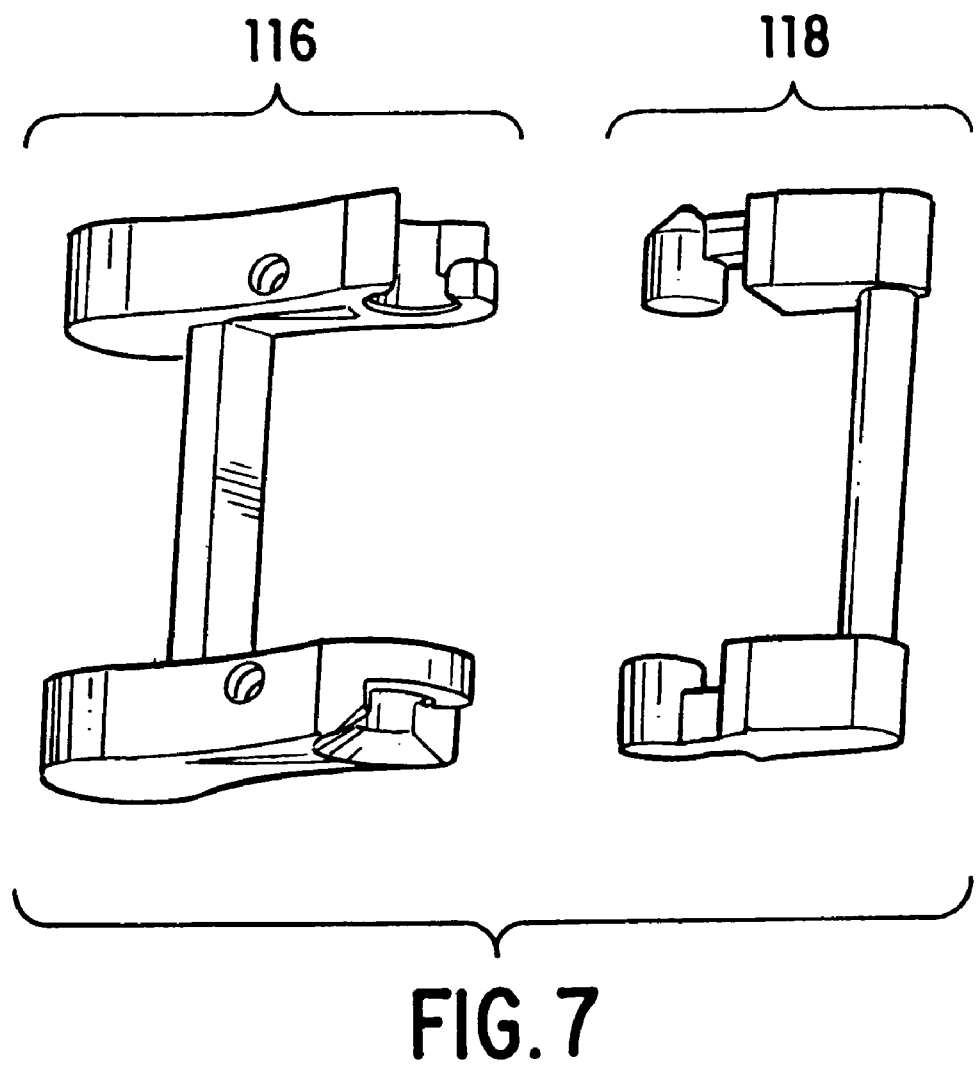
FIG. 7 is a perspective view of the second embodiment of the leader block and tape block.

FIG. 7 illustrates a second embodiment of the inventive leader block and tape block. In this second embodiment, tape block 118 is similar in design to leader block 41 (FIG. 2) however the features used to form a connection with leader block 116 are rotated as shown. Likewise, the leader block 116 is similar in design to tape block 39 (FIG. 2) however the features used to from a connection with tape block 118 are rotated as shown.

Figure 8:
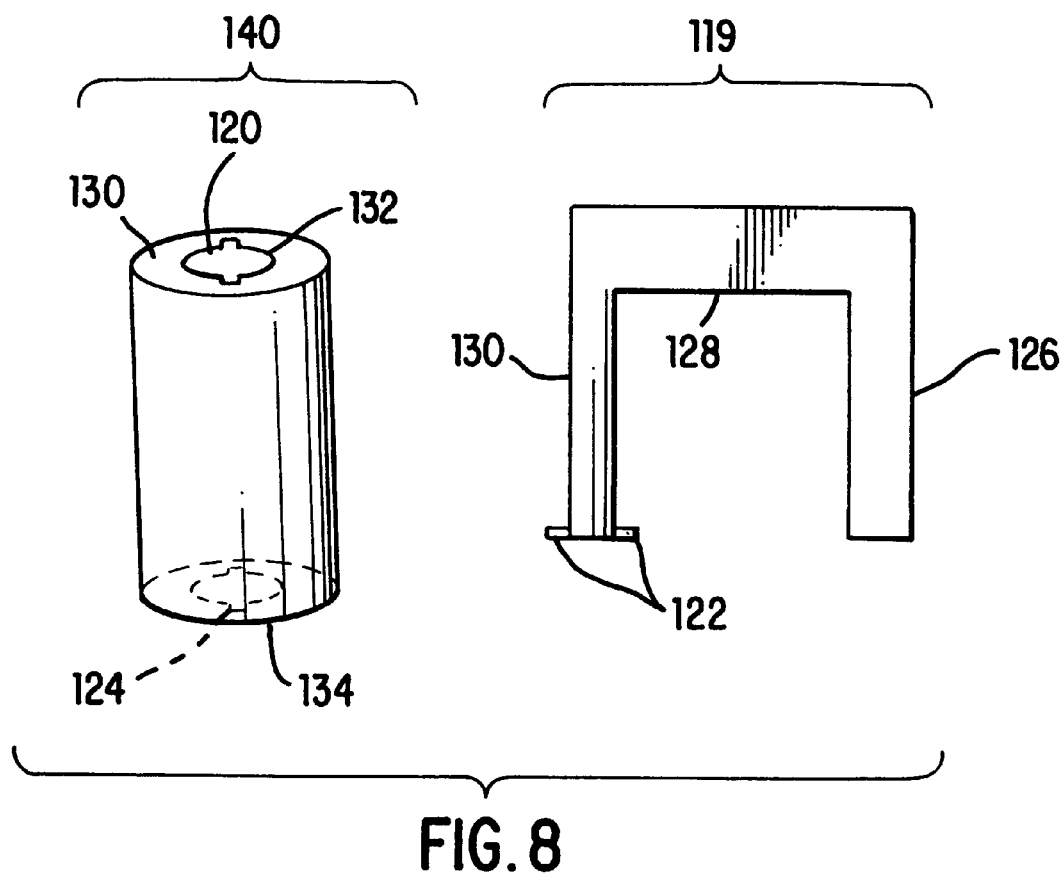
FIG. 8 is a perspective view of yet another embodiment of the leader block and the tape block.

FIG. 8 is a perspective view of yet another embodiment of the inventive leader block and tape block. In this embodiment, tape block 119 is shown having a support member 126 for attaching the leader tape thereto and connection features that include a horizontal member 128, a vertical member 130 and a pair of lower protrusions 122 extending horizontally at a pre-connective angle. Leader block 140 includes a cylindrical shaped wall 120 forming a bore therethrough, an upper surface 130 and a lower surface 134. Upper surface 130 include a notch 132 and lower surface 134 includes notch 124. Both of these notches are adapted to receive the pair of protrusions 122 only if tape block 119 and leader block 140 are at a pre-connective orientation. It can be seen that tape block 119 and leader block 140 operate in a similar manner as the first two embodiments. While in the pre-connective mated orientation, the lower surface of horizontal member 128 bears against the upper surface 130. After achieving the pre-connective mated orientation, tape block 119 and leader block 140 may then be oriented to a connective orientation so that the protrusions 122 are rotated below lower bearing surface 134.

It can be seen that the present invention reduces the complexity and therefore cost of the cartridge engagement mechanism. This follows from the ability to establish a connection between tape block and leader block with movement of the cartridge along a simple cartridge load path into the tape transport system and placing the take-up reel in a winding condition. Thus no additional mechanism other than that required to rotate the leader block and tape block to a pre-connective angle is required to establish the connection between leader block and tape block.

Furthermore, the first two embodiments of the present invention described above include self-alignment features that allow for a reduction in the precision at which the cartridge engagement mechanism must move the cartridge in order to achieve proper mating between the leader block and tape block. This further reduces the complexity of the cartridge engagement mechanism. In addition, the receiving features of the leader block and the connection features of the tape block are outside of the magnetic tape threading path. This simplifies the problem of designing a take-up reel for receiving the leader block and tape block while maintaining a smooth cylindrical substrate for subsequent wraps of magnetic tape.

It should be understood that the foregoing description is only illustrative of the invention. Various alternatives and modifications can be devised by those skilled in the art without departing from the invention. For example, in the preferred embodiment other take-up reel circumferences, threading paths, leader tape lengths or leader tape thickness may be used. Also, while the invention has been described for use in a tape transport system having a leader tape, it is equally applicable to other types of web transport systems. For example the present invention can easily be adapted for use in a Pantocam Web Threading Apparatus. Such an apparatus is described in U.S. Pat. No. 4,399,396 entitled "Pantocam Web Threading Apparatus". That patent is incorporated by reference as if set out in full herein. Accordingly, the present invention is intended to embrace all such alternatives, modifications and variances that fall within the scope of the appended claims.

What is claimed is:

1. A leader block for connecting to a tape block, comprising:
   (a) a coupler for receiving said tape block only at a pre-connective angle along an axis common to said leader block and said tape block; and
   (b) a retainer structured for maintaining a connection with said tape block in a connective orientation, said connective orientation obtained by changing the angle between said tape block and said leader block from said pre-connective angle to a connective angle after said tape block is received by said coupler, said retainer connected to said coupler and said connective angle is different from said pre-connective angle.

2. The leader block of claim 1, wherein said coupler includes a substantially C-shaped inner wall forming an aperture for axially receiving, along said axis, a first cylindrical surface of said tape block and for allowing a rib section of said tape block to pass through said inner wall with said tape block at said pre-connective angle.

3. The leader block of claim 2, wherein said inner wall includes a lower end and said retainer includes a substantially horizontal bearing surface connected to said lower end of said C-shaped inner wall, said bearing surface being shaped and positioned such that upon said connective orientation being obtained, said rib section is captured below said bearing surface.

4. A tape transport system, comprising:
   (a) coupler means for receiving a tape block only at a pre-connective angle; and (b) retainer means for maintaining a connection with said tape block in a connective orientation, said connective orientation obtained by changing the angle between said tape block and said leader block from said pre-connective angle to a connective angle after said tape block is received by said coupler and said connective angle is different from said pre-connective angle.

5. The tape transport system of claim 4, wherein said coupler means includes a substantially C-shaped inner wall forming an aperture for axially receiving along said axis, a first cylindrical surface of said tape block and for allowing a rib section of said tape block to pass through said inner wall with said tape block at said pre-connective angle.

6. The tape transport system of claim 5, wherein said retainer means includes a substantially horizontal bearing surface connected to a lower end of said C-shaped inner wall, said bearing surface shaped and positioned such that upon said connective orientation being obtained said rib section is captured below said bearing surface.

* * * * *